United States Patent
Kelley et al.

(10) Patent No.: US 8,001,077 B2
(45) Date of Patent: Aug. 16, 2011

(54) DISTRIBUTED METHOD FOR SYNCHRONIZING AND UPDATING BOOKMARKS ON MULTIPLE COMPUTER DEVICES

(75) Inventors: Edward E. Kelley, Wappingers Falls, NY (US); Mark E. Elliott, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 11/306,016

(22) Filed: Dec. 14, 2005

(65) Prior Publication Data

US 2007/0136306 A1    Jun. 14, 2007

(51) Int. Cl.
 *G06F 7/06* (2006.01)
(52) U.S. Cl. ......... 707/614; 707/616; 707/622; 715/206
(58) Field of Classification Search .................. 707/615, 707/614, 616, 621–623; 715/206
See application file for complete search history.

(56) References Cited

U.S. PATENT DOCUMENTS

| | | | |
|---|---|---|---|
| 5,553,279 A | | 9/1996 | Goldring |
| 5,991,771 A | | 11/1999 | Falls et al. |
| 5,999,931 A | * | 12/1999 | Breitbart et al. ............... 707/10 |
| 6,023,708 A | * | 2/2000 | Mendez et al. ........................ 1/1 |
| 6,052,695 A | | 4/2000 | Abe et al. |
| 6,226,650 B1 | * | 5/2001 | Mahajan et al. .............. 707/201 |
| 6,295,541 B1 | * | 9/2001 | Bodnar et al. ................ 707/203 |
| 6,374,262 B1 | * | 4/2002 | Kodama ....................... 707/201 |
| 6,549,217 B1 | | 4/2003 | De Greef et al. |
| 6,557,028 B2 | | 4/2003 | Cragun |
| 6,584,466 B1 | | 6/2003 | Serbinis et al. |
| 6,631,496 B1 | * | 10/2003 | Li et al. ...................... 715/501.1 |
| 6,671,757 B1 | * | 12/2003 | Multer et al. ................. 710/100 |
| 6,718,365 B1 | | 4/2004 | Dutta |
| 6,725,227 B1 | | 4/2004 | Li |
| 7,711,707 B2 | | 5/2010 | Kelley et al. |

(Continued)

FOREIGN PATENT DOCUMENTS

EP    1 030 247    8/2000

(Continued)

OTHER PUBLICATIONS

Kelly, U.S. Appl. No. 11/306,014, U.S. Office Action, Jul. 8, 2008.

(Continued)

*Primary Examiner* — Robert Timblin
*Assistant Examiner* — James E Richardson
(74) *Attorney, Agent, or Firm* — Witham, Curtis, Christofferson & Cook, P.C.; Ronald A. Kaschak

(57) ABSTRACT

Multiple computer devices are networked, and each computer device stores a bookmark database. A user can add delete or change bookmarks on any of the computer devices. Alterations made to a bookmark database are stored locally. Every alteration is time stamped. If a bookmark is deleted, it is marked as deleted, but not erased from the local bookmark database. Bookmark databases stored on other computer devices are unaffected by changes made to the bookmark database stored on the local device. In order to update and synchronize all the bookmark databases, the local device receives the data from all the other bookmark databases. Then, the time stamps for each bookmark are compared, and the bookmarks with the most recent time stamps are assembled in a new master bookmark database. The new master bookmark database is then sent to all participating devices in the network.

12 Claims, 3 Drawing Sheets

U.S. PATENT DOCUMENTS

| | | | |
|---|---|---|---|
| 2002/0116405 A1* | 8/2002 | Bodnar et al. | 707/202 |
| 2002/0174142 A1* | 11/2002 | Demers et al. | 707/509 |
| 2002/0178146 A1 | 11/2002 | Akella et al. | |
| 2003/0076786 A1* | 4/2003 | Richard | 370/252 |
| 2003/0097361 A1* | 5/2003 | Huang et al. | 707/10 |
| 2003/0154187 A1* | 8/2003 | Hayakawa et al. | 707/621 |
| 2003/0172070 A1* | 9/2003 | Sawadsky et al. | 707/10 |
| 2003/0182327 A1* | 9/2003 | Ramanujam et al. | 707/204 |
| 2005/0021527 A1 | 1/2005 | Zhang et al. | |
| 2006/0015546 A1* | 1/2006 | Sawadsky et al. | 707/204 |
| 2006/0224622 A1 | 10/2006 | Velega | |

FOREIGN PATENT DOCUMENTS

| | | |
|---|---|---|
| WO | WO 01/71491 | 9/2001 |
| WO | WO 2004/014053 | 2/2004 |

OTHER PUBLICATIONS

Kelly, U.S. Appl. No. 11/306,014, U.S. Office Action, Jul. 21, 2009.
Kelly, U.S. Appl. No. 11/306,014, U.S. Office Action, Dec. 29, 2008.
Kelly, U.S. Appl. No. 11/306,014, U.S. Office Action, Dec. 12, 2007.
Kelly, U.S. Appl. No. 11/306,014, Notice of Allowance and Issue Fee Due, Dec. 18, 2009.

* cited by examiner

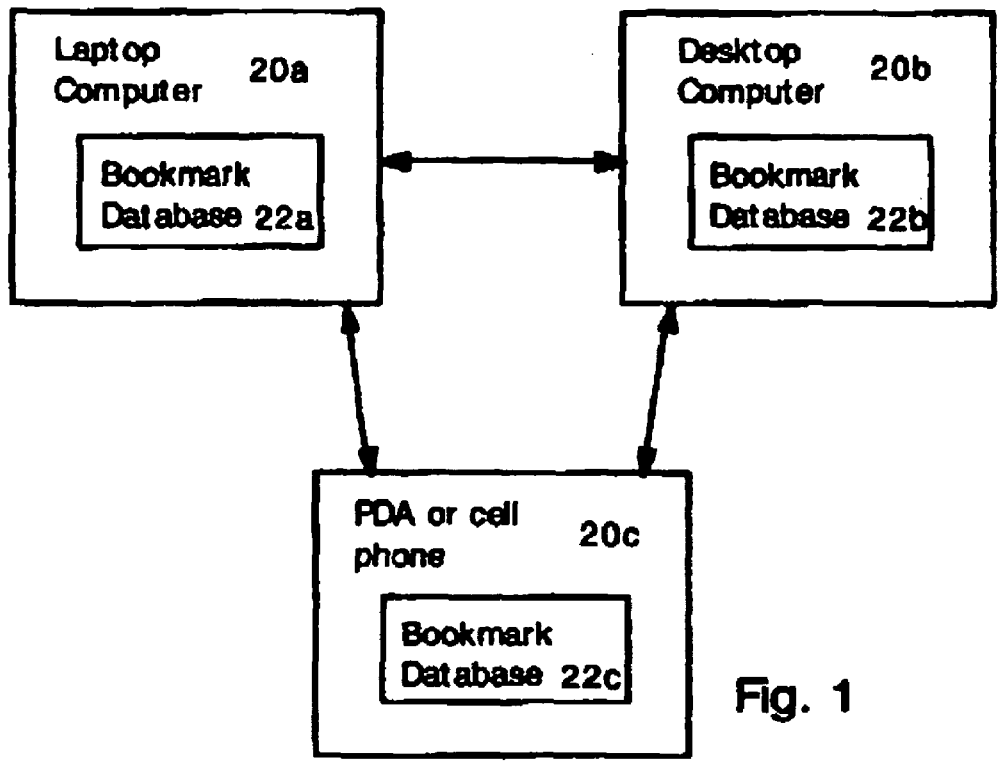

| Bookmark Database | | | 22b |
|---|---|---|---|
| # | Bookmark URL | Bookmark Time Stamp | Bookmark deleted? |
| 1 | www.example.com/abc | 2:01 PM, 12/21/04 | No |
| 2 | www.rense.com/UFOs | 11:43 PM, 06/23/05 | No |
| 3 | www.ibm.com/tech | 4:12 PM, 06/23/05 | No |
| 4 | www.wired.com/nanotech | 7:07 PM, 06/23/05 | No |
| 5 | www.theonion.com/ | 4:23 PM, 04/07/05 | No |
| 6 | www.thenation.com | 7:07 PM, 06/23/05 | No |

Fig. 3

| Master Bookmark Database | | | |
|---|---|---|---|
| # | Bookmark URL | Bookmark Time Stamp | Bookmark deleted? |
| 1 | www.rense.com/UFOs | 11:43 PM, 06/23/05 | No |
| 2 | www.ibm.com/tech | 4:12 PM, 06/23/05 | No |
| 3 | www.wired.com/nanotech | 7:07 PM, 06/23/05 | No |
| 4 | www.theonion.com/ | 4:23 PM, 04/07/05 | No |
| 5 | www.thenation.com | 7:07 PM, 06/23/05 | No |

Fig. 4

DISTRIBUTED METHOD FOR SYNCHRONIZING AND UPDATING BOOKMARKS ON MULTIPLE COMPUTER DEVICES

CROSS-REFERENCE TO RELATED APPLICATIONS

This application is related to U.S. patent application Ser. No. 11/306,014 filed concurrently herewith which is assigned to the assignee of the present invention and fully incorporated by reference.

BACKGROUND OF THE INVENTION

1. Field of the Invention

The present invention generally relates to a method for synchronizing and updating website bookmarks on multiple computer devices. In particular, the present invention provides a method for multiple computer devices to share and update bookmark information.

2. Description of the Prior Art

Many people today use multiple Internet navigation devices to access websites or Internet databases. For example, a person may use a desktop computer, laptop computer, personal digital assistant (PDA), and cell phone to access the same, frequently visited websites. To enable convenient access to these websites, website locations (e.g. universal resource locators, or URLs) are stored as bookmarks on each computer or cell phone. In the present state of the art, these bookmarks are stored and maintained separately on each Internet enabled device. Hence, when a website or database URL changes, or if other changes are made to stored bookmarks, the new bookmark information must be separately updated on each Internet enabled device. For example, a user may have to separately and manually update bookmarks on a computer and cell phone. This can be a troublesome inconvenience to a person that regularly uses 2, 3 or more Internet navigation devices.

This problem also occurs in corporate or governmental intranets when bookmarks (e.g. pointing to Internet websites or internal database locations) are updated. In this case, the bookmarks on each computer in the intranet (e.g. possibly hundreds of computers), will need to be updated with the new bookmark data.

Sometimes, a computer user can avoid the problem of updating bookmarks by accessing bookmarks on a remote, updating networked device that has the most recent bookmark files. However, this solution is manual and therefore time-consuming, and may not be possible if the device with the most recent bookmark data is unavailable (e.g. off-line or powered down), if the user incorrectly recollects the device with the most recent bookmark data or the bookmark data, even though most recently updated, is not complete such as in the case where different changes are made from different computer devices.

What is needed is a simple, automated (or semi-automated) method for updating bookmarks on a plurality of devices. Such a method could assure that any participating devices have access to the most current bookmark data. Such a method could be used by individuals that use several Internet enabled devices, and by large corporate networks to synchronize and update bookmark files.

SUMMARY OF THE INVENTION

The present invention provides a method for combining and sharing bookmarks from multiple computer devices. In the present method, each computer device stores a bookmark database. Each bookmark in each bookmark database includes a URL, a bookmark time stamp, and a deletion indicator. The bookmark time stamp indicates the time of the most recent change to the bookmark.

Any bookmark database can be altered to add or change a bookmark, or change a deletion indicator of a bookmark. The deletion indicator shows whether a user has entered a request to delete a bookmark.

Every time a bookmark is altered, the time stamp of the bookmark is updated. Bookmark databases are combined to create a master bookmark database. First, corresponding bookmarks from a plurality of bookmark databases are compared according to time stamp. The master bookmark database is then created by assembling bookmarks with the most recent time stamps and can then be distributed to other network connected computer devices associated with a user or group of users. Bookmarks indicated as deleted are not included in the master bookmark database.

Bookmark databases can be combined on a single computer device, or alternatively, the combining process can be performed by multiple computer devices cooperatively over the computer network.

The bookmark database combining process can be triggered manually.

After the master bookmark database is created, it can be transmitted to other participating computer devices connected to the network.

Also, bookmarks can have bookmark identifiers such that corresponding bookmarks in different databases can be easily identified, even if bookmarks are changed.

The present invention includes a computer device with software instructions for performing the method of the present invention.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a high-level schematic diagram of a network of computer devices that can employ the method of the present invention.

FIG. 2 shows an exemplary bookmark database stored on the laptop computer 20a.

FIG. 3 shows an exemplary bookmark database stored on the desktop computer 20b.

FIG. 4 shows an exemplary master bookmark database created by combining the bookmark databases from FIG. 2 and FIG. 3.

DETAILED DESCRIPTION OF A PREFERRED EMBODIMENT OF THE INVENTION

Figure 5:
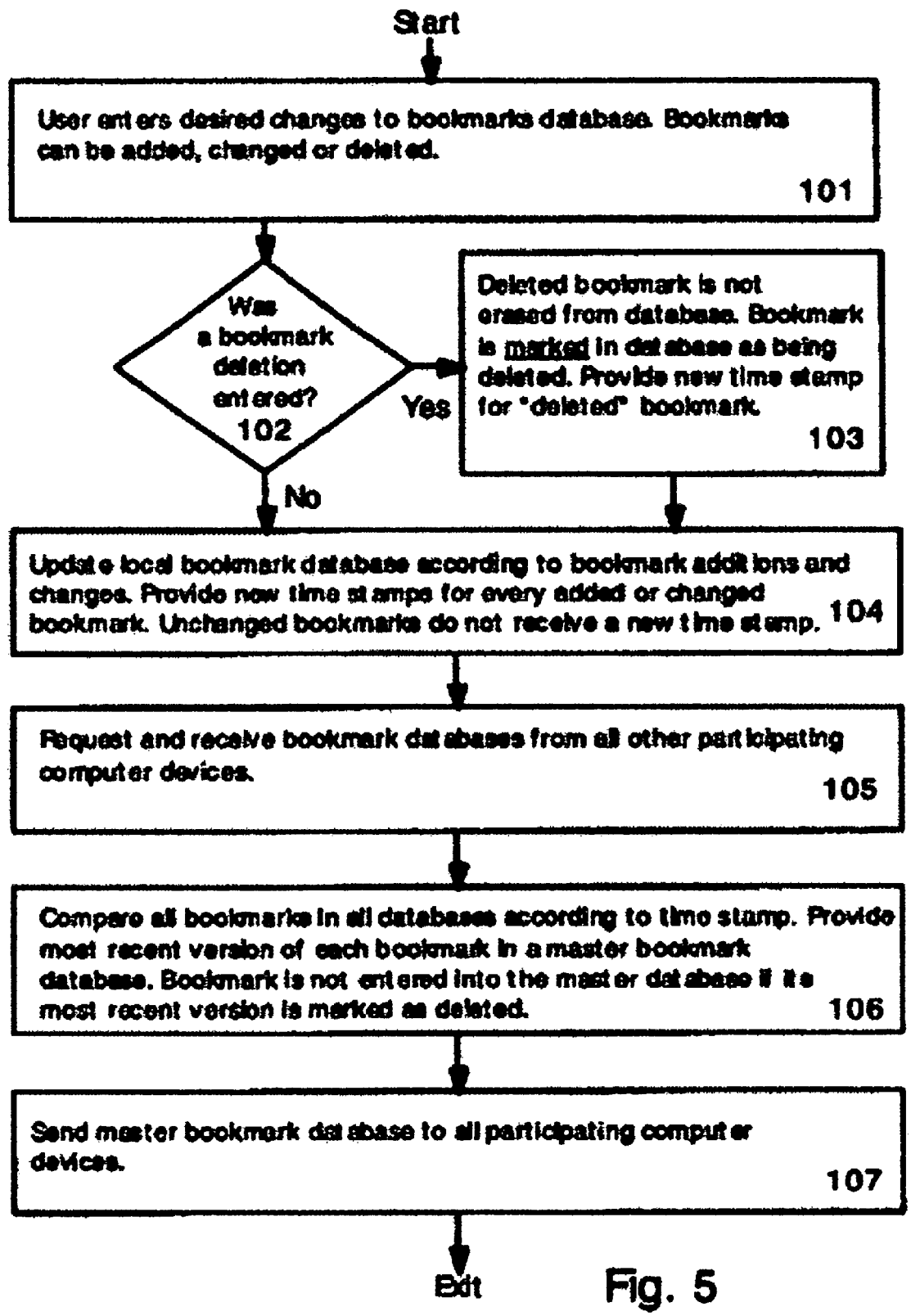
FIG. 5 shows a flow chart of a method of the present invention.

The present invention provides a method for synchronizing, sharing, and updating bookmark data among a plurality of computer devices. The present invention can be used to update bookmark databases on computers, cell phones, PDAs or any other devices capable of navigating the Internet or other databases via bookmarks. In the present invention, bookmarks are defined as files that include data indicating the network location (e.g. a URL) of desired data.

In the present invention, every computer device has a bookmark database that includes bookmark information, and time stamps indicating the time of the most recent change to each bookmark. Every computer operating the present software is capable of making additions, deletions and changes to its own bookmark database. When a user changes or adds a bookmark in the bookmark database, the time stamp of the bookmark is updated, and the change is entered. If a user deletes a bookmark, the bookmark is preferably merely marked as deleted in a deletion indicator, and the time stamp is updated. Periodically, or when the user requests, the bookmark databases from all participating devices are sent to one computer device. According to the present invention, each bookmark in every database is analyzed according to its time stamp. A master bookmark database is created by combining the most recent (according to time stamp) bookmarks from every computer device or machine. If the deletion indicator shows a bookmark has been deleted, and the deleted bookmark has the most recent time stamp, then the deleted bookmark is not included in the master bookmark database. Finally, the master bookmark database is sent to all the participating devices (e.g. computer devices associated with a particular user or group of users). The present method can be performed on any of the participating devices, preferably.

FIG. 1 shows a network of computer devices according to the present invention. The network includes computer devices 20a 20b 20c such as a laptop computer, desktop computer, and a PDA or cell phone. The computer devices can be connected by the Internet, Ethernet, Universal Serial Bus (USB), wireless network or the like. Preferably, all the peripheral devices are in communication with all the other devices as illustrated. Some computer devices can be indirectly in communication with other devices or the network, for example through another computer device.

Each computer device 20a, 20b, 20c, is capable of navigating the Internet or other computer network or database via bookmarks. Each computer device has a bookmark database 22a, 22b, 22c, that stores a list of commonly used bookmarks. Each computer device 20a, 20b, 20c, can be used to alter its associated bookmark database 22a 22b 22c.

FIG. 2 shows an exemplary bookmark database 22a (the laptop database), stored on the laptop computer 20a. Each bookmark preferably has a bookmark identifier (shown in the in the "#" column), a Universal Resource Locator (URL), a bookmark time stamp (indicating the time of the most recent modification to each bookmark), and a deletion indicator (shown in the "bookmark deleted?" column). The bookmark identifier is used to identify bookmarks so that changes can be tracked between bookmark databases if a bookmark URL is changed. The bookmark identifier is optional but preferred in the invention.

The deletion indicator indicates whether a particular bookmark has been deleted by a user since the most recent update operation. In the specific example of FIG. 2, bookmark #1, (the www.example.com/abc bookmark) has been deleted. It is important to note that bookmarks that are indicated as deleted are not erased from the bookmarks database until an update operation (explained below) is performed.

Bookmarks that have been changed or added are not necessarily marked as such. However, the bookmark database can include a field for indicating if a bookmark has been added or changed since the most recent update operation. A bookmark change indicator is within the scope of the present invention and appended claims.

FIG. 3 shows another exemplary bookmark database 22b (the desktop database) stored on the desktop computer 20b. The bookmark database 22b on the desktop computer has differences from the bookmark database 22a on the laptop computer 20a. Bookmark database 22a has been used and altered on the laptop computer 20a, and bookmark database 22b has been used and altered (in different ways) on the desktop computer 20b.

Specifically, bookmark #1 on the laptop database 22a for www.example.com/abc was deleted (i.e. marked as deleted) on Aug. 23, 2005 using the laptop computer. This deletion is not present on the desktop database 22b. Bookmark #1 for www.example.com/abc on the desktop database 22b has an older time stamp indicating that it was last altered on Dec. 21, 2004.

Similarly, in desktop database 22b, bookmarks #2, #3, #4 were changed on Jun. 23, 2005 (using the desktop computer 20b). Also, bookmark #6 for www.thenation.com was added. The time stamps for these changes are more recent than the time stamps for corresponding bookmarks #2, #3, #4, and #6 on laptop database 22a.

In an update operation, laptop database 22a and desktop database 22b are combined to create a master bookmark database, illustrated in FIG. 4. The master bookmark database will reflect the most recent changes Made to each bookmark. In the update operation, both the laptop database 22a and desktop database 22b are consolidated on a single machine (e.g. the laptop database 22a can be sent to the desktop computer 20b or vice-versa). Then, corresponding bookmarks (i.e., bookmarks having the same bookmark identifier #) are compared and the most recent bookmark is found, based on the time stamp. Then, the most recent bookmarks are assembled to create the master bookmark database. Bookmarks marked as deleted are not added to the master bookmark database.

FIG. 4 illustrates the result of combining databases 22a and 22b in an update operation. For brevity, PDA database 22c is ignored. The bookmark for www.example.com/abc is not found in the master bookmark database because the most recent time stamp for this bookmark (Aug. 23, 2005) indicates it has been deleted. Similarly, bookmarks #2, #3, #4, and #6 are taken from the desktop database 22b since they have the most recent time stamps. In this way, the master bookmark database reflects the most up-to-date changes made on both the laptop computer 20a and desktop computer 20b. In the master bookmark database, the bookmarks can be renumbered so that they have new bookmark identifiers.

After the master bookmark database has been created, it can be sent to all the participating devices in the network (i.e. the laptop 20a, desktop 20b, and PDA 20c). The master bookmark database can overwrite the prior bookmark databases 22a 22b 22c. In this way, all the computer devices will have the most recent bookmark data after the update operation and transmission of the master bookmark database.

It is noted that the present invention can be practiced without consolidating all the bookmark databases 22a, 22b, 22c, on a single device. For example, the computer devices 20a, 20b, 20c, can compare individual bookmarks over the network, and cooperatively create the master bookmark database. Such an embodiment is within the scope of the present invention.

Also, it is noted that the update operation can be triggered in many ways. For example, the update operation can be performed periodically (e.g. once per day or once per week), by the user at any time, or whenever a certain number of bookmarks have been altered (e.g. when 3 or more bookmarks have been altered since the last update operation).

FIG. 5 shows a flow chart illustrating the method of the present invention. The steps proceed as follows:

Step 101: A user operating one of the computer devices 20a, 20b, 20c enters alterations to be made to a bookmark database 22a, 22b, 22c Stored on the computer device. Bookmarks can be added, changed or deleted. It is important to note that the alterations at this time are limited to the bookmark database on the computer currently operated by the user.

Step 102/103: If a user enters a deletion of a bookmark, the bookmark is marked as deleted in the bookmark database. Specifically, this done by changing the deletion indicator. The "deleted" bookmark is not erased at this time. Preferably, the bookmark that is marked as deleted is not available on a bookmarks menu visible to the user after step 103. The time stamp of the deleted bookmark is updated.

Step 104: Changes and additions to the bookmark database are entered, and time stamps for changed and added bookmarks are updated.

Step 105: Step 105 represents the first step in an update operation in which all the bookmark databases 22a 22b 22c are consolidated on a single computer device. Step 105 is optional; in the present invention the master bookmark database can be created cooperatively by the computer devices over the network.

Step 106: In the update operation, corresponding bookmarks (e.g. having the same bookmark identifier) are compared, and the most recent bookmarks are assembled to create the master bookmark database. Bookmarks marked as deleted are not entered into the master bookmark database.

Step 107: The master bookmark database is sent to all participating computer devices on the network.

In this way, all the computer devices will receive the most up-to-date bookmark data. The computer user will not have to compare bookmarks or manually determine which bookmarks are the most recent.

The present invention provides a convenient method for synchronizing and maintaining a bookmark database on multiple networked devices. With the present invention, bookmark databases become portable across many devices and a computer user with several devices will not have to manually update and synchronize bookmark data. Retrieval of bookmark data can be automatic. The user will not have to research for websites, or manually find websites already bookmarked on other devices. The present invention can allow a user to share bookmarks between widely separated computer devices, for example a desktop computer at a work office, and a laptop computer located at home. By using the time stamps, the present invention will also keep bookmark databases accurately synchronized and will avoid possible errors that could result from old alterations made to a bookmark database. The present invention provides a convenient and simple solution for maintaining bookmark databases on multiple computer devices.

It will be clear to one skilled in the art that the above embodiment may be altered in many ways without departing from the scope of the invention. Accordingly, the scope of the invention should be determined by the following claims.

What is claimed is:

1. A method for combining bookmarks from a plurality of personal computer devices communicating through or directly with each other through a network interconnecting the personal computer devices, comprising the steps of:
   a) storing on each personal computer device of said plurality of personal computer devices a bookmark database, wherein each bookmark in each bookmark database includes a URL, a bookmark time stamp, and a deletion indicator;
   b) altering a bookmark database stored on any of the personal computer devices, wherein altering can be any of adding a bookmark, changing the URL of a bookmark, or changing a deletion indicator of a bookmark;
   c) providing a new time stamp to any bookmark altered in step (b);
   d) comparing, according to time stamp, corresponding bookmarks from a plurality of bookmark databases of respective personal computer devices of said plurality of personal computer devices, wherein said comparing step occurs at or between any of said plurality of personal computer devices; and
   e) combining bookmark databases of respective personal computer devices of said plurality of personal computer devices to create a master bookmark database on any one of said plurality of personal computer devices from bookmarks with the most recent time stamps as found by said comparing step, wherein bookmarks indicated as deleted are not included in the master bookmark database.

2. The method of claim 1, wherein before step (d) bookmark databases from multiple personal computer devices are transmitted to a single personal computer device, and wherein the single personal computer device performs steps (d) and (e).

3. The method of claim 1, wherein the master bookmark database is created on a single personal computer device.

4. The method of claim 1, wherein steps (d) and (e) can be triggered manually.

5. The method of claim 1, further comprising the step of transmitting the master bookmark database to at least one personal computer device.

6. The method of claim 1, wherein every bookmark has a bookmark identifier, and corresponding bookmarks in different databases have the same bookmark identifier.

7. A personal computer device for creating a master bookmark database available to other personal computer devices communicating through or directly with each other through a network interconnecting the personal computer devices, comprising:
   a) a computer readable memory device storing a bookmark database, wherein each bookmark in the bookmark database has a URL, a bookmark time stamp, and a deletion indicator;
   b) software instructions stored in the memory device for performing the following steps:
      1) altering a bookmark database stored on the personal computer device, wherein altering can be any of adding a bookmark, changing the URL of a bookmark, or changing a deletion indicator of a bookmark;
      2) providing a new time stamp to any bookmark altered in step (1);
      3) comparing, according to time stamp, corresponding bookmarks from a plurality of bookmark databases stored on the personal computer device and respective ones of the personal computer devices, wherein said comparing step occurs at said personal computer device or between said personal computer device and any of said plurality of personal computer devices;
      4) combining bookmark databases of respective personal computer devices of said plurality of personal computer devices to create a master bookmark database on any one of said personal computer devices from bookmarks with the most recent time stamps as found by said comparing step, wherein bookmarks indicated as deleted by the deletion indicator are not included in the master bookmark database; and
   c) a processor device for implementing the software instructions, and 5) transmitting the master bookmark database to at least one networked personal computer device after step (4).

8. A method for sharing bookmarks among a plurality of personal computer devices communicating through or directly with each other through a network interconnecting the personal computer devices, comprising the steps of:
   a) storing on each personal computer device of said plurality of personal computer devices a bookmark database, wherein each bookmark in each bookmark database includes a URL, a bookmark time stamp, and a deletion indicator;
   b) altering a bookmark database stored on any of the personal computer devices, wherein altering can be any of adding a bookmark, changing the URL of a bookmark, or changing a deletion indicator of a bookmark;
   c) providing a new time stamp to any bookmark altered in step (b);
   d) comparing, according to time stamp, corresponding bookmarks from a plurality of bookmark databases of respective personal computer device of said plurality of personal computer devices, wherein said comparing step occurs at or between any of said plurality of networked personal computer devices;
   e) combining bookmark databases of respective personal computer devices of said plurality of personal computer devices to create a master bookmark database on any one of said plurality of personal computer devices from bookmarks with the most recent time stamps, wherein bookmarks indicated as deleted are not included in the master bookmark database; and
   f) transmitting the master bookmark database to at least one personal computer device.

9. The method of claim 8, wherein before step (d) bookmark databases from personal multiple computer devices are transmitted to a single personal computer device, and wherein the single personal computer device performs steps (d), (e) and (f).

10. The method of claim 8, wherein the master bookmark database is created on a single personal computer device.

11. The method of claim 8, wherein steps (c), (d), (e) and (f) can be triggered manually.

12. The method of claim 8, wherein every bookmark has a bookmark identifier, and corresponding bookmarks in different databases have the same bookmark identifier.

* * * * *